UNITED STATES PATENT OFFICE.

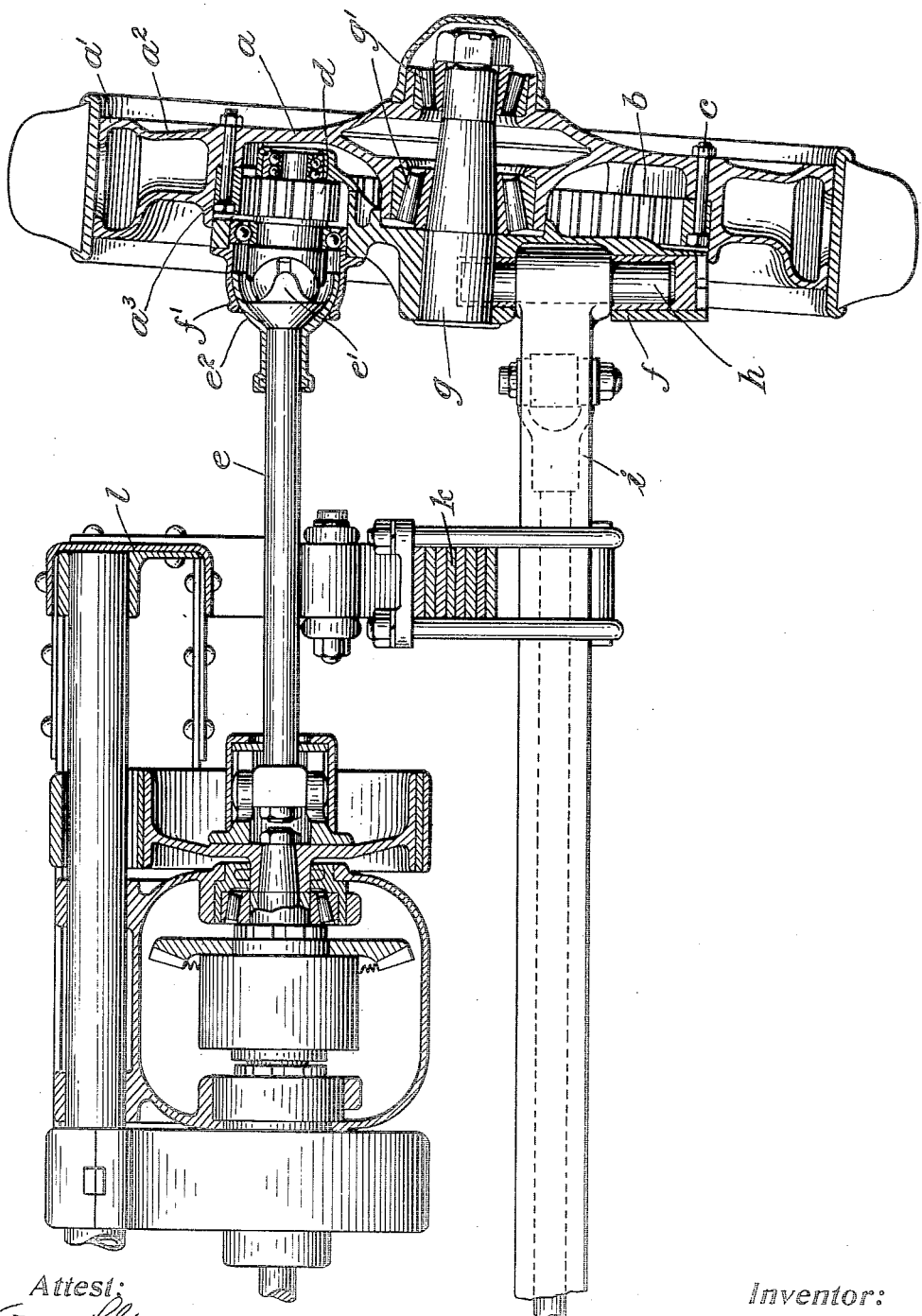

MAURICE WALTER, OF NEW YORK, N. Y.

DRIVING-WHEEL FOR MOTOR-VEHICLES.

1,309,266.   Specification of Letters Patent.   Patented July 8, 1919.

Original application filed September 13, 1916, Serial No. 119,842. Divided and this application filed February 20, 1917. Serial No. 149,844.

*To all whom it may concern:*

Be it known that I, MAURICE WALTER, a citizen of the United States, residing in the borough of Manhattan of the city of New York, in the State of New York, have invented certain new and useful Improvements in Driving-Wheels for Motor-Vehicles, of which the following is a specification, reference being had to the accompanying drawing, forming a part hereof.

This application is a division of an application filed by the present applicant on September 13, 1916, Ser. No. 119,842, and covers an invention relating to driving wheels for motor vehicles. While the structural features are applicable to one or more of such driving wheels when embodied in a vehicle, the improvements will be found of especial advantage in association with commercial vehicles of the type in which both the driving and steering efforts are applied to each one of the four wheels. The general objects of the invention are to provide a semi-disk wheel of simple construction in which may be mounted the associated driving elements and with which may be associated a steering knuckle of such form as to inclose completely all such elements to prevent the entrance of dust and dirt. A further object of the invention has to do with the mounting of the wheel on the axle and particularly, the relation of the supporting spindle of the wheel to the axle and the Cardan shaft. In attaining this last named object the Carden shaft is geared with the wheel above the spindle while the axle is engaged therewith below the spindle, so that the driving reaction neutralizes in part the torque reaction. A further object of the invention is to journal the steering pivot in the wheel in such relation to the plane of the wheel as to insure a rolling action in the turning movements of the wheel as distinguished from a twisting action. Further details of the construction will be described at greater length hereinafter in connection with the accompanying drawing, which is a view in central section through one of the improved wheels, and showing so much of the truck frame and the driving elements of the wheel as is necessary for an understanding of the invention.

The improved wheel may be termed conveniently a semi-disk wheel in that it comprises a central section $a$ which is of lesser diameter than the felly $a'$ and is connected with the felly by means of a series of relatively short spokes $a^2$ which extend between the felly and the periphery of the disk. This construction insures the greatest resiliency and durability for a minimum weight of metal and assures the disposition of the metal at the desired section of the wheel. In the rear face of the disk $a$ is provided an annular shoulder $a^3$ to receive a large internal driving gear $b$ which is bolted to the disk by an annular series of bolts $c$. With this internal gear is meshed a driving pinion $d$ which is carried on the end of the Cardan shaft $e$ and is connected therewith flexibly by a ball universal joint $e'$ thereby permitting that degree of flexibility which is necessary in a driving unit of this character. On the rear face of the disk $a$ is secured a steering knuckle formed conveniently as a circular plate $f$ which rests snugly within the annular shoulder $a^3$ of the disk and incloses entirely the driving units of the wheel and the supporting elements thereof as will appear hereinafter. Through this knuckle plate extends the supporting spindle $g$ for the wheel, the wheel proper being supported on the spindle by a suitable bearing $g'$. The steering pivot $h$ on the end of the axle $i$ has its axis disposed vertically and is journaled in the steering knuckle plate $f$ in a plane substantially coincident with the plane through the inner edge of the tire of the wheel. This steering pivot is disposed below the spindle $g$. The object of this construction is to impart to the wheel in its turning movements, a rolling action as distinguished from a twisting one and the result sought can only be secured by alining the axis of the pivot $h$ with the inner edge of the tire. The same result has been sought heretofore by various means and it has formerly been proposed to place the steering pivot $h$ in the plane of the tread of the tire and also well outside of the plane of the wheel, but both of these constructions have been faulty in either permitting a twisting action on the tread of the tire or in producing an exaggerated rolling action which makes it difficult to control the direction of movement. In the improved construction there has been shown a convenient way of forming the steering pivot and mounting it in the wheel at the desired point.

It is to be noted further that both the Cardan shaft *e* and the steering pivot *h* are carried in the knuckle plate *f*. Free movement of the wheel and axle without interfering with the transmission of the driving effort being insured by the universal joint *e'*. This joint has associated with it a spherical casing *f'* on the knuckle plate *f* which partially incloses a corresponding spherical section $e^2$ on the Cardan shaft *e*, the engagement of these sections being such as to hold the members of the universal joint in proper engagement and also to exclude dirt and dust therefrom. In this construction, it is evident that compactness is secured and one or more of the elements are made to serve in a dual function, as for instance, the knuckle plate *f* which is, at once, a knuckle, a cover plate, and a journal bearing for several of the parts.

A further very important feature of the invention has to do with the relative disposition of the spring *k* and the axle *i*. By disposing the pivot *h* of the steering knuckle off center with relation to the spindle *g*, that is, well below it, and extending the Cardan shaft *e* to the wheel along a line near its periphery, the axle *i* is prepared to be dropped well below the side frame members *l* of the chassis and the spring *k*, and the axle *i* has its resiliency and effectiveness correspondingly increased while affording ready accessibility to all of the parts under the chassis. Furthermore, the placing of the axle below the wheel spindle so that the point of application of the spring to the axle shall be below the axis of the spindle, makes it possible to utilize the driving reaction to neutralize in part the torque reaction. Of course, the driving reaction is transmitted to the spring *k* from the point of engagement of the axle with the wheel so that the important thing is to mount the pivot *h* below the spindle *g*. On the other hand, the torque reaction through the Cardan shaft *e* is applied at the point of engagement of the pinion *d* with the internal gear *b*. Since the torque reaction is opposed to the driving reaction it is quite evident that these two may be neutralized to a greater or less extent by applying them to the wheels at opposite sides of the spindle *g*. It is believed that this has been done, for the first time, in the improved wheel.

The features of simplicity, accessibility, compactness and durability are all embodied in the improved construction while the best possible mechanical actions and reactions have been taken into account so that maximum efficiency in the drive and minimum stresses on the wheel might be realized. Mechanical changes will suggest themselves to one skilled in the art but these changes will not constitute a departure from the spirit of the invention provided they fall within the scope of the appended claims.

I claim as my invention:

1. In a motor vehicle, a disk wheel having an annular shoulder in its rear face, an internal driving gear mounted on the shoulder, a Cardan shaft engaged operatively with said driving gear, a spindle for the wheel, a steering pivot on which the wheel is supported and a circular steering knuckle plate fitted within the shoulder to inclose the wheel and carrying the spindle and journal bearings for the Cardan shaft, and the steering pivot.

2. In a motor vehicle, a driving wheel and steering devices associated therewith and including a wheel spindle, a steering knuckle plate, a steering pivot journaled in the knuckle plate and having its axis below the wheel spindle and substantially in the plane of the inner edge of the tread of the wheel, an internal gear carried on the wheel and a driving pinion therefor mounted in the steering knuckle plate.

3. In a motor vehicle, a disk wheel having an annular shoulder, an annular gear supported on the shoulder, a steering knuckle plate fitting within the shoulder, a Cardan shaft journaled in the knuckle plate and provided with a pinion in engagement with the gear, a wheel spindle carried by the knuckle plate, and a steering pivot on the axle journaled in the knuckle plate below the spindle, the driving pinion being engaged with the internal gear at a point above the spindle.

4. In a motor vehicle, in combination with a driving wheel, steering devices associated therewith, an internal gear bolted in the wheel, a steering knuckle plate to one side of the wheel and inclosing certain of the associated elements, a driving pinion rotatably mounted on the steering knuckle plate and engaged with the internal gear, a universal joint in juxtaposition to said pinion, a spherical sleeve to inclose said joint, an axle, and a steering pivot carried on the axle and journaled in the steering knuckle plate below the axis of the wheel and having its axis substantially within the plane of the edge of the tire.

This specification signed this 19th day of February, A. D. 1917.

MAURICE WALTER.